United States Patent
Nuggehalli et al.

(10) Patent No.: US 8,797,563 B2
(45) Date of Patent: Aug. 5, 2014

(54) APPROACH FOR PRINTING POLICY-ENABLED ELECTRONIC DOCUMENTS USING LOCKED PRINTING

(75) Inventors: Jayasimha Nuggehalli, Cupertino, CA (US); Seiichi Katano, Cupertino, CA (US); Seong Kim, Saratoga, CA (US)

(73) Assignee: Ricoh Company, Ltd., Tokyo (JP)

( * ) Notice: Subject to any disclaimer, the term of this patent is extended or adjusted under 35 U.S.C. 154(b) by 407 days.

(21) Appl. No.: 12/059,836

(22) Filed: Mar. 31, 2008

(65) Prior Publication Data

US 2009/0244594 A1    Oct. 1, 2009

(51) Int. Cl.
  *G06K 15/00*   (2006.01)
  *G06F 3/12*   (2006.01)

(52) U.S. Cl.
  USPC ............................ 358/1.14; 358/1.16; 358/1.1

(58) Field of Classification Search
  CPC . G06F 21/608; G06F 21/6209; G06F 3/1222; G06F 3/1238; G06F 3/128
  USPC .................................................... 358/1.1–1.9
  See application file for complete search history.

(56) References Cited

U.S. PATENT DOCUMENTS

| | | | |
|---|---|---|---|
| 5,113,355 A | 5/1992 | Nomura | |
| 5,880,447 A | 3/1999 | Okada et al. | |
| 5,970,218 A | 10/1999 | Mullin et al. | |
| 6,161,139 A | 12/2000 | Win et al. | |
| 6,614,546 B1 | 9/2003 | Kurozasa | |
| 6,862,583 B1 | 3/2005 | Mazzagatte et al. | |
| 6,938,154 B1* | 8/2005 | Berson et al. | 713/156 |
| 6,965,449 B2 | 11/2005 | Sugiyama | |
| 6,970,259 B1* | 11/2005 | Lunt et al. | 358/1.14 |
| 7,002,703 B2 | 2/2006 | Parry | |
| 7,079,269 B2 | 7/2006 | Teeuwen et al. | |

(Continued)

FOREIGN PATENT DOCUMENTS

| | | | |
|---|---|---|---|
| EP | 0 657 845 A2 | 11/1994 | |
| EP | 1 091 275 A2 | 4/2001 | |

(Continued)

OTHER PUBLICATIONS

European Patent Office, "European Search Report", European patent application EP 08 16 0705, dated Nov. 12, 2008, 10 pages.

(Continued)

*Primary Examiner* — King Poon
*Assistant Examiner* — Ibrahim Siddo
(74) *Attorney, Agent, or Firm* — Hickman Palermo Truong Becker Bingham Wong LLP; Edward A. Becker

(57) ABSTRACT

An approach is provided for printing policy-enabled electronic documents using locked printing. A printing device includes a user interface, a print process for processing print data and printing documents and a locked print process. When print data is received by a printing device, a determination is made whether an electronic document contained in the print data is a policy-enabled electronic document. If so, then the print data is treated as locked print data by being stored on the printing device and not immediately processed for printing. In response to both successfully verifying a user and a request to print the electronic document via a user interface at the printing device, a determination is made whether the user is authorized by a policy to print the electronic document. If so, then the print data is processed and the electronic document is printed at the printing device.

15 Claims, 5 Drawing Sheets

(56) References Cited

U.S. PATENT DOCUMENTS

| | | | |
|---|---|---|---|
| 7,110,541 B1 * | 9/2006 | Lunt et al. | 380/51 |
| 7,136,176 B2 | 11/2006 | Sugiyama | |
| 7,170,623 B2 | 1/2007 | Matoba et al. | |
| 7,271,925 B2 | 9/2007 | Nishiyama | |
| 7,313,699 B2 | 12/2007 | Koga | |
| 7,359,076 B2 | 4/2008 | Uchino | |
| 7,382,487 B2 * | 6/2008 | Ikegami | 358/1.6 |
| 7,450,260 B2 | 11/2008 | Takeda et al. | |
| 7,609,412 B2 * | 10/2009 | Maruyama | 358/1.9 |
| 7,660,803 B2 * | 2/2010 | Jin | 715/741 |
| 7,667,865 B2 | 2/2010 | Ciriza et al. | |
| 7,697,760 B2 * | 4/2010 | Kwok et al. | 382/186 |
| 8,130,392 B2 * | 3/2012 | Kato | 358/1.15 |
| 8,302,205 B2 * | 10/2012 | Kanai | 726/27 |
| 8,363,243 B2 | 1/2013 | Nuggehalli | |
| 2001/0029521 A1 | 10/2001 | Matsuda et al. | |
| 2001/0038462 A1 | 11/2001 | Teeuwen et al. | |
| 2002/0023143 A1 | 2/2002 | Stephenson et al. | |
| 2002/0097431 A1 * | 7/2002 | Ikegami | 358/1.15 |
| 2002/0120855 A1 | 8/2002 | Wiley et al. | |
| 2003/0065404 A1 | 4/2003 | Bhatti | |
| 2003/0090696 A1 | 5/2003 | Willis et al. | |
| 2003/0090697 A1 | 5/2003 | Lester et al. | |
| 2004/0088378 A1 | 5/2004 | Moats | |
| 2004/0117389 A1 | 6/2004 | Enami et al. | |
| 2004/0118911 A1 | 6/2004 | Black et al. | |
| 2004/0125402 A1 | 7/2004 | Kanai et al. | |
| 2004/0140611 A1 | 7/2004 | Mui et al. | |
| 2004/0156068 A1 | 8/2004 | Yoshida et al. | |
| 2004/0165216 A1 | 8/2004 | Nauta | |
| 2004/0169884 A1 | 9/2004 | Yamada | |
| 2004/0196492 A1 | 10/2004 | Johnson et al. | |
| 2004/0246515 A1 | 12/2004 | Patton et al. | |
| 2004/0257601 A1 | 12/2004 | Tomiyasu et al. | |
| 2004/0263870 A1 | 12/2004 | Itoh et al. | |
| 2005/0094195 A1 | 5/2005 | Sakamoto et al. | |
| 2005/0100378 A1 | 5/2005 | Kimura et al. | |
| 2005/0141013 A1 | 6/2005 | Kikuchi et al. | |
| 2005/0183141 A1 | 8/2005 | Sawada | |
| 2005/0254086 A1 | 11/2005 | Shouno | |
| 2005/0276618 A1 | 12/2005 | Clement et al. | |
| 2006/0017954 A1 | 1/2006 | Ly et al. | |
| 2006/0028672 A1 | 2/2006 | Abiko | |
| 2006/0044607 A1 * | 3/2006 | Kato | 358/1.15 |
| 2006/0074840 A1 | 4/2006 | Gava | |
| 2006/0112021 A1 | 5/2006 | Maki | |
| 2006/0170947 A1 | 8/2006 | Kurabayashi | |
| 2006/0244998 A1 | 11/2006 | Salgado | |
| 2006/0268287 A1 | 11/2006 | Robinson | |
| 2006/0285141 A1 | 12/2006 | Kim et al. | |
| 2007/0019224 A1 | 1/2007 | Okada et al. | |
| 2007/0022467 A1 * | 1/2007 | Filbrich | 726/2 |
| 2007/0091360 A1 * | 4/2007 | Iizuka | 358/1.15 |
| 2007/0127055 A1 | 6/2007 | Kujirai et al. | |
| 2007/0133044 A1 * | 6/2007 | Tanaka | 358/1.15 |
| 2007/0146768 A1 * | 6/2007 | Isoda | 358/1.14 |
| 2007/0234400 A1 | 10/2007 | Yanagi | |
| 2007/0247660 A1 | 10/2007 | Nuggehalli | |
| 2007/0273925 A1 | 11/2007 | Hong | |
| 2007/0279671 A1 | 12/2007 | Shouno | |
| 2008/0002225 A1 | 1/2008 | Iwasaki | |
| 2008/0037052 A1 | 2/2008 | Nishiguchi | |
| 2008/0066185 A1 | 3/2008 | Lester et al. | |
| 2008/0114922 A1 | 5/2008 | Chou et al. | |
| 2008/0117452 A1 | 5/2008 | Murakami | |
| 2008/0180723 A1 | 7/2008 | Selvaraj | |
| 2008/0259380 A1 | 10/2008 | Nuggehalli | |
| 2009/0086252 A1 | 4/2009 | Zucker et al. | |
| 2009/0097059 A1 | 4/2009 | Iijima | |
| 2009/0207439 A1 | 8/2009 | Oomura | |
| 2009/0244594 A1 | 10/2009 | Nuggehalli et al. | |
| 2009/0244595 A1 | 10/2009 | Kim | |
| 2009/0244596 A1 | 10/2009 | Katano | |
| 2009/0316181 A1 | 12/2009 | Shoji et al. | |
| 2010/0002248 A1 | 1/2010 | Nuggehalli et al. | |
| 2010/0002249 A1 | 1/2010 | Nuggehalli et al. | |
| 2010/0014110 A1 | 1/2010 | Munetomo | |
| 2010/0333183 A1 | 12/2010 | Yago | |
| 2011/0013219 A1 | 1/2011 | Nuggehalli et al. | |
| 2011/0107396 A1 | 5/2011 | Ozaki | |
| 2012/0127504 A1 | 5/2012 | Nuggehalli et al. | |
| 2012/0140264 A1 | 6/2012 | Nuggehalli | |
| 2013/0083363 A1 | 4/2013 | Kim | |
| 2013/0169991 A1 | 7/2013 | Nuggehalli | |

FOREIGN PATENT DOCUMENTS

| | | |
|---|---|---|
| EP | 1 143 695 | 10/2001 |
| EP | 1 143 695 A2 | 10/2001 |
| EP | 1 229 724 | 8/2002 |
| EP | 1 229 724 A2 | 8/2002 |
| EP | 1229724 | 8/2002 |
| EP | 1229724 A2 | 8/2002 |
| EP | 1 367 814 | 12/2003 |
| EP | 1 465 052 A2 | 10/2004 |
| EP | 1 566 719 A2 | 2/2005 |
| EP | 1 511 287 | 3/2005 |
| EP | 1 621 994 | 2/2006 |
| EP | 1621994 A1 | 2/2006 |
| EP | 1 091 275 | 4/2011 |
| JP | 6152814 A | 5/1994 |
| JP | 11-191043 | 7/1999 |
| JP | 2001067201 A | 3/2001 |
| JP | 2001125982 A | 5/2001 |
| JP | 2001217948 A | 8/2001 |
| JP | 2002007095 A | 1/2002 |
| JP | 2002199153 A | 7/2002 |
| JP | 2002-312146 | 10/2002 |
| JP | 2004181647 A | 7/2004 |
| JP | 2004-221979 | 8/2004 |
| JP | 2005178070 A | 7/2005 |
| JP | 2005196741 A | 7/2005 |
| JP | 2005-225099 | 8/2005 |
| JP | 2006205374 A | 8/2006 |
| JP | 2006227908 A | 8/2006 |
| JP | 2006231675 A | 9/2006 |
| JP | 2006252142 A | 9/2006 |
| JP | 2006260245 A | 9/2006 |
| JP | 2006297624 A | 11/2006 |
| JP | 2006-341404 | 12/2006 |
| JP | 2007055022 A | 3/2007 |
| JP | 2007087305 A | 4/2007 |
| JP | 2007-140916 | 7/2007 |
| JP | 2007176082 | 7/2007 |
| JP | 2007188477 A | 7/2007 |
| JP | 2007203736 A | 8/2007 |
| JP | 2007241939 | 9/2007 |
| JP | 2007-304931 | 11/2007 |
| JP | 2007290396 A | 11/2007 |
| JP | 2008-040981 | 2/2008 |
| JP | 2008097075 A | 4/2008 |
| JP | 2008102783 A | 5/2008 |
| JP | 2008103867 A | 5/2008 |
| WO | WO 00/68817 | 11/2000 |
| WO | WO 00/68817 A | 11/2000 |

OTHER PUBLICATIONS

European Patent Office, "European Search Report", Application No. 07121257.5-1228, dated Mar. 31, 2008, 6 pages.

Claims, Application No. 07121257.5-1228, 9 pages.

Claims, European patent application 07250426.9-1245, 2 pages.

European Patent Office, "European Search Report", European patent application 07250426.9-1245, dated Jun. 12, 2008, 19 pages.

European Patent Office, "European Search Report", application No. EP 09 15 6660, dated Jul. 6, 2009, 7 pages.

European Patent Office, "European Search Report", in application No. 09164263.7, dated May 4, 2012, 6 pages.

European Patent Office, "European Search Report", application No. EP 09156641, dated Jul. 2, 2009, 8 pages.

European Patent Office, "Partial European Search Report", European patent application 07250426.9-1245, received Mar. 10, 2008, 5 pages.

(56) References Cited

OTHER PUBLICATIONS

European Patent Office, "European Search Report", EP application No. EP 07252112, dated Mar. 1, 2010, 6 pages.
European Patent Office, "Office Action" in application No. 07 252 112.3-1959, dated Nov. 28, 2013, 5 pages.
European Patent Office, "Search Report" in application No. 09 156 660.4, dated Sep. 18, 2013, 6 pages.
U.S. Appl. No. 13/753,133, filed Jan. 29, 2013, Notice of Allowance Jan. 30, 2014.
U.S. Appl. No. 13/633,046, Filed Oct. 1, 2012, Office Action Feb. 20, 2014.

* cited by examiner

APPROACH FOR PRINTING POLICY-ENABLED ELECTRONIC DOCUMENTS USING LOCKED PRINTING

RELATED APPLICATION DATA

This application is related to U.S. patent application Ser. No. 12/059,916 entitled APPROACH FOR PROCESSING PRINT DATA USING PASSWORD CONTROL DATA, filed Mar. 31, 2008; U.S. patent application Ser. No. 12/059,986 entitled APPROACH FOR PRINTING POLICY-ENABLED ELECTRONIC DOCUMENTS USING LOCKED PRINTING AND A SHARED MEMORY DATA STRUCTURE, filed Mar. 31, 2008; U.S. patent application Ser. No. 12/166,741 entitled PRINT DRIVER FOR PRINTING POLICY-ENABLED ELECTRONIC DOCUMENTS USING LOCKED PRINTING, filed Jul. 2, 2008; U.S. patent application Ser. No. 11/439,796 entitled REMOTE STORED PRINT JOB RETRIEVAL, filed May 23, 2006; U.S. patent application Ser. No. 11/411,248 entitled APPROACH FOR IMPLEMENTING LOCKED PRINTING WITH REMOTE UNLOCK ON PRINTING DEVICES, filed Apr. 25, 2006; U.S. patent application Ser. No. 11/346,479 entitled APPROACH FOR IMPLEMENTING LOCKED PRINTING ON PRINTING DEVICES, filed Feb. 1, 2006; U.S. patent application Ser. No. 11/656,592 entitled FAULT TOLERANT PRINTING SYSTEM, filed Jan. 22, 2007; U.S. patent application Ser. No. 11/788,517 entitled APPROACH FOR IMPLEMENTING LOCKED PRINTING WITH UNLOCK VIA A KEYPAD, filed Apr. 20, 2007; and U.S. patent application Ser. No. 11/880,359 entitled APPROACH FOR PROCESSING PRINT JOBS ON PRINTING DEVICES, filed Jul. 20, 2007, the contents all of which are incorporated by reference in their entirety for all purposes as if fully set forth herein.

FIELD OF THE INVENTION

This invention relates generally to printing of electronic documents.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

The proliferation of communications networks, and in particular the Internet, has raised growing concerns about the security of information transmitted over networks. Numerous protection schemes have been implemented to secure electronic documents transmitted over the Internet, ranging from simple passwords to strong encryption. Policy-based solutions have also been developed that allow business organizations to control access to electronic documents. An electronic document for which the access thereto is controlled using a policy is referred to hereinafter as "policy-enabled document." A policy defines the conditions under which a user is granted access to an electronic document. For example, a policy might specify that particular users are allowed access to the electronic document. Alternatively, the policy might specify that all users on a particular project, or all users at a specified level or higher within a business organization, may access the electronic document.

When a user attempts to open the electronic document through an application, the application prompts the user for user credentials, typically in the form of a user ID and password. The user credentials are authenticated to verify the user. Then, the credentials are provided to a policy server along with data that identifies the electronic document that the user is attempting to access. The policy server retrieves a policy associated with the electronic document and then determines, based upon the policy, whether the user should be allowed to access the electronic document. The policy server returns data to the application that indicates whether the user is allowed to access the electronic document. The application selectively allows the user access to the electronic document based upon the data provided by the policy server.

One of the main benefits of the policy-based approach is that the access rights for any number of electronic documents may be changed by changing single policy, without having to change each of the electronic documents. For example, a business organization may change a single policy for a product that may affect access to a hundreds or even thousands of electronic documents.

One of the limitations of using policies to control access to electronic documents is that once a user has been granted access to an electronic document, the electronic document may be distributed to and accessed by other users, either in electronic or printed form. For example, once a user has been granted access to a policy-enabled electronic document and printed the document, third parties may access the printed document, with or without the consent of the user. Thus, policy-based solutions do not provide control over electronic documents once they have been printed, which can be a significant problem for documents containing sensitive information. Based on the foregoing, there is a need for an approach for controlling access to electronic documents that does not suffer from limitations of prior approaches.

SUMMARY

According to one embodiment of the invention, a printing device comprises a user interface, a print process and a locked print process. The user interface is configured to display information to users and receive user input from the users. The print process is configured to process print data and cause a printed version of an electronic document contained in the print data to be generated by the printing device. The locked print process executes on the printing device and is configured to examine print data received by the printing device to determine whether an electronic document contained in the print data is a policy-enabled document. If the electronic document contained in the print data is a policy-enabled document, then the locked print causes the print data to be stored at the printing device instead of being processed for printing. Also, in response to both a successful verification of a user and a request to print the electronic document via the user interface at the printing device, a determination is made whether the user is authorized by a policy to print the electronic document. If so, then the electronic document is printed at the printing device. This approach allowing policy-enabled electronic documents to be printed remotely, but manages the print data on printing devices as locked print data to provide improved control. The use of locked printing for policy-enabled electronic documents ensures that users are present at a printing device when the policy-enabled documents are printed. Furthermore, the approach is compatible with existing locked printing and policy-based solutions for controlling access to electronic documents.

BRIEF DESCRIPTION OF THE DRAWINGS

In the figures of the accompanying drawings like reference numerals refer to similar elements.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. Overview
II. Architecture for Printing Policy-Enabled Electronic Documents Using Locked Printing
III. Printing a Policy-Enabled Electronic Document Using Locked Printing
IV. Implementation Mechanisms I. Overview An approach is provided for printing policy-enabled electronic documents using locked printing. A printing device includes a user interface, a print process for processing print data and printing documents and a locked print process. When print data is received by a printing device, a determination is made whether an electronic document contained in the print data is a policy-enabled electronic document. If so, then the print data is treated as locked print data and is stored on the printing device and not immediately processed for printing. In response to both successfully verifying a user and a request to print the electronic document via a user interface at the printing device, a determination is made whether the user is authorized by a policy to print the electronic document. For example, the printing device may consult with a policy server to determine whether the user is authorized to print the electronic document. If the user is authorized by the policy to print the electronic document, then the print data is processed and the electronic document is printed at the printing device.

This approach allowing policy-enabled electronic documents to be printed remotely but manages the print data on printing devices as locked print data to provide improved control. The use of locked printing for policy-enabled electronic documents ensures that users are present at a printing device when the policy-enabled documents are printed. Furthermore, the approach is compatible with existing locked printing and policy-based solutions for controlling access to electronic documents.

Figure 1:
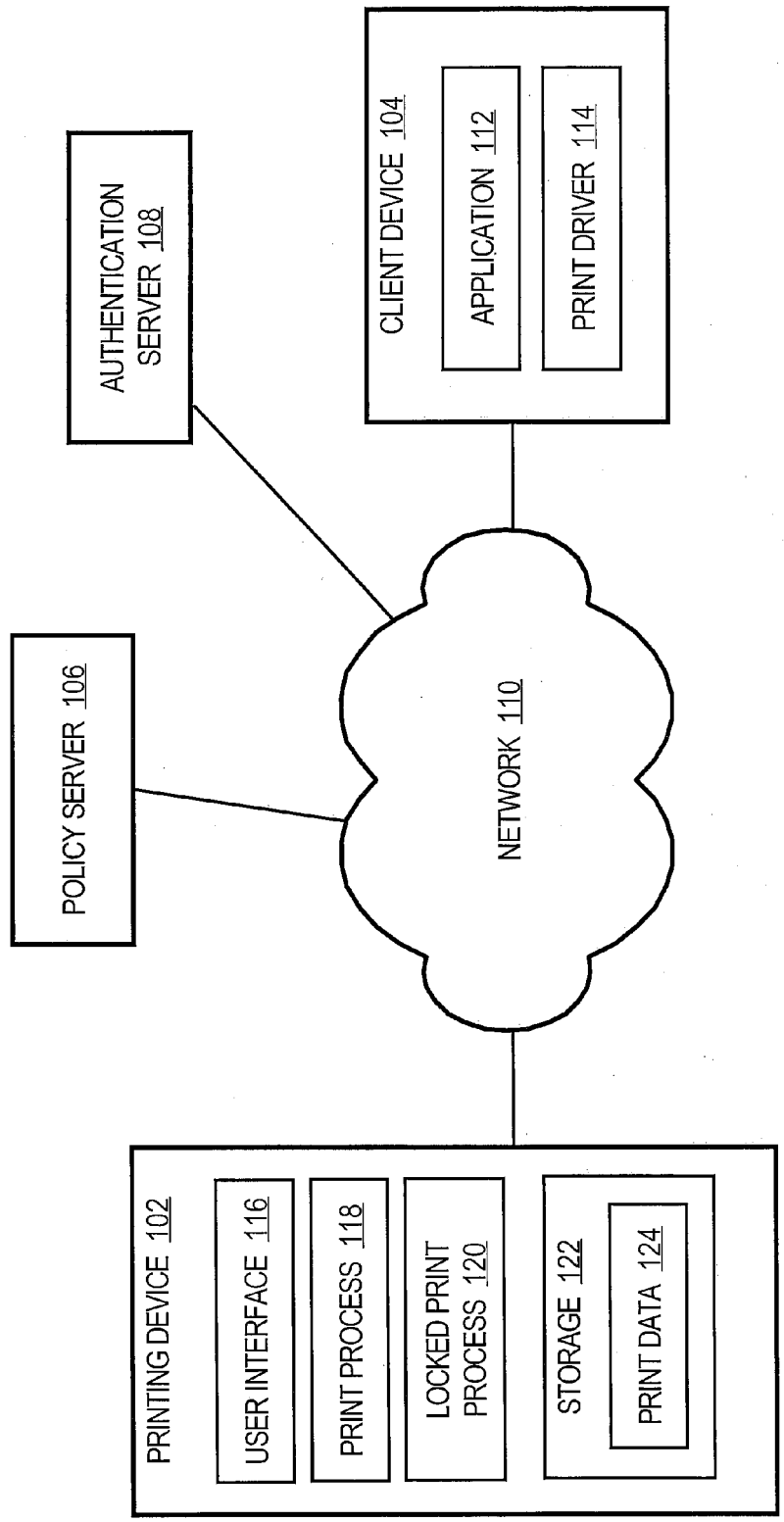
FIG. 1 is a block diagram that depicts an arrangement for printing policy-enabled electronic documents using locked printing according to an embodiment of the invention.

II. Architecture for Printing Policy-Enabled Electronic Documents Using Locked Printing FIG. 1 is a block diagram that depicts an arrangement 100 for printing policy-enabled electronic documents using locked printing according to an embodiment of the invention. Arrangement 100 includes a printing device 102, a client device 104, a policy server 106 and an authentication server 108, communicatively coupled via a network 110.

Printing device 102 may be implemented by any type of device that is capable of processing print data and generating printed versions of electronic documents reflected in the print data. In example arrangement 100, printing device 102 includes a user interface 116, a print process 118, a locked print process 120 and storage 122. Printing device 102 may be configured with other mechanisms, processes and functionality, depending upon a particular implementation, and the approach described herein for printing policy-enabled documents on a printing device using locked printing is not limited to any particular type of printing device 102. For example, printing device 102 may be a multi-function peripheral (MFP) that includes any combination of printing, copying, facsimile and scanning capability, etc.

User interface 116 may be any mechanism and/or medium that provides for the exchange of information between a user and printing device 102. Examples of user interface 116 include, without limitation, a control panel with a display and keypad or keyboard, a cathode ray tube (CRT), a liquid crystal display (LCD), a keyboard, touchpad, mouse, trackball, a microphone and speakers, and any combination thereof. Printing device 102 may be configured to display information on user interface 116 in any number of languages, depending upon a particular implementation. As with conventional printing devices, the user interface 116 on printing device 102 may provide limited capability to easily enter alphanumeric strings.

Print process 118 may be implemented by one or more processes for processing print data received from client device 104 and for generating a printed version of an electronic document reflected in the print data. Print process 118 and locked print process 120 may be implemented as resident processes on printing device 102. Alternatively, print process 118 and locked print process 120 may be made available to printing device 102 on a removable media or may be implemented at a remote location with respect to printing device 102. Locked print process may be implemented by one or more processes for providing locked print services on printing device 102.

Figure 2:
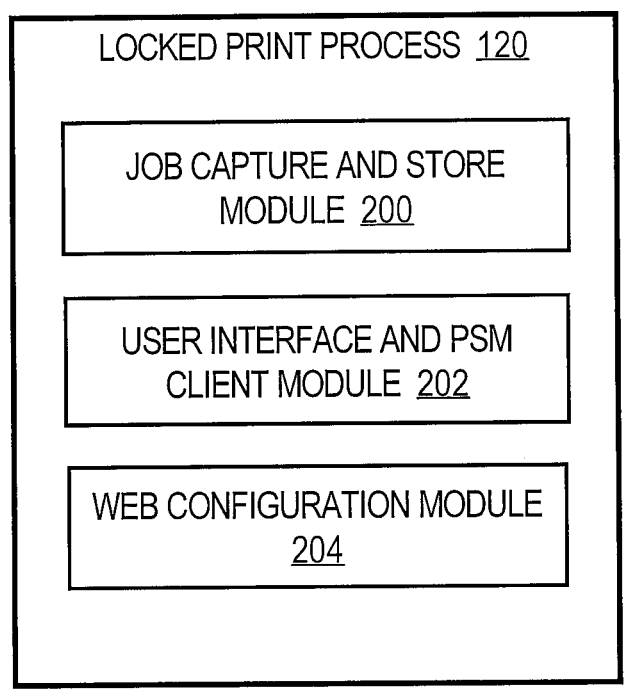
FIG. 2 is a block diagram that depicts an example implementation of locked print process, according to one embodiment of the invention.

FIG. 2 is a block diagram that depicts an example implementation of locked print process 120, according to one embodiment of the invention. In this example, locked print process 120 includes a job capture and store module 200, a user interface and PSM client module 202 and a Web configuration module 204. Job capture and store module 200 determines whether print data received by printing device 102 is designated as a locked print job. This may include examining the contents of the print data and/or a header associated with the print data to detect the presence of data that indicates that the print data is a locked print job. If print data received by printing device 102 is not designated as a locked print job, then the print data is processed in the order in which it was received. If print data received by printing device 102 is designated as a locked print job, then job capture and store module 200 causes the print data to be stored on storage 122 instead of being immediately processed for printing. To print an electronic document that has been designated for locked print, a user enters user credentials, e.g., a user ID and password, into user interface 116. The locked print process 120 authenticates the user ID and password, either locally or remotely, and if successful, displays a list of locked print jobs associated with that user that are stored on storage 122. The user may select one or more of the locked print jobs for printing and the locked print process 120 causes the selected print jobs to be processed.

User interface and PSM client module 202 causes information to be displayed to a user on user interface 116 and also processes user input received via the user interface 116. The user interface and PSM client module 202 also communicates with the policy server 106 to determine whether a user is authorized by a policy to print a particular electronic document, as described in more detail hereinafter. Web configuration module 204 allows a user, such as an administrator, to configure locked print parameters. For example, the Web configuration module 204 may provide a Web-based user interface for an administrator.

Storage 122 may be implemented by any type of storage, including volatile storage, non-volatile storage, or any combination of volatile and non-volatile storage. Examples of storage 122 include, without limitation, random access memory (RAM) and one or more disks.

User interface 116, print process 118, locked print process 120 and storage 122 may be implemented in hardware, software, or any combination of hardware or software, depending upon a particular implementation.

Client device 104 may be implemented by any type of client device. Example implementations of client device 104 include, without limitation, workstations, personal computers, laptop computers, personal digital assistants (PDAs), cellular telephony devices and any type of mobile devices. In the example arrangement depicted in FIG. 1, client device 104 is configured with an application 112 and a print driver 114. Application 112 may be any type of application process. Examples of application 112 include, without limitation, a word processor, a spreadsheet program and an email client. Print driver 114 is configured to provide a user interface for a user to specify that locked printing is to be used to print particular print data. Print driver 114 is also configured to process data from application 112 and generate print data that is provided to printing device 102 for processing. Thus, application 112 and print driver 114 operate together to generate and provide print data to printing device 102. Client device 104 may be configured with other mechanisms, processes and functionality, depending upon a particular implementation.

Policy server 106 is an entity that is capable of determining, based upon a policy, whether a user is authorized to print an electronic document. For example, given a user ID, password and identification of an electronic document, policy server 106 is able to determine whether, based upon a policy, the user is authorized to print the electronic document. Authentication server 108 is an entity that is capable of authenticating a user. For example, authentication server 108 may be configured to determine whether a user ID and password pair match any of a set of User ID and password pairs stored on authentication server 108 and provide a message or other corresponding indication.

Network 110 may be implemented by any type of medium and/or mechanism (wired or wireless) that facilitates the exchange of information between client device 104, printing device 102 and client device 104. Furthermore, network 110 may use any type of communications protocol and may be secured or unsecured, depending upon the requirements of a particular application.

III. Printing a Policy-Enabled Electronic Document Using Locked Printing

Figure 3:
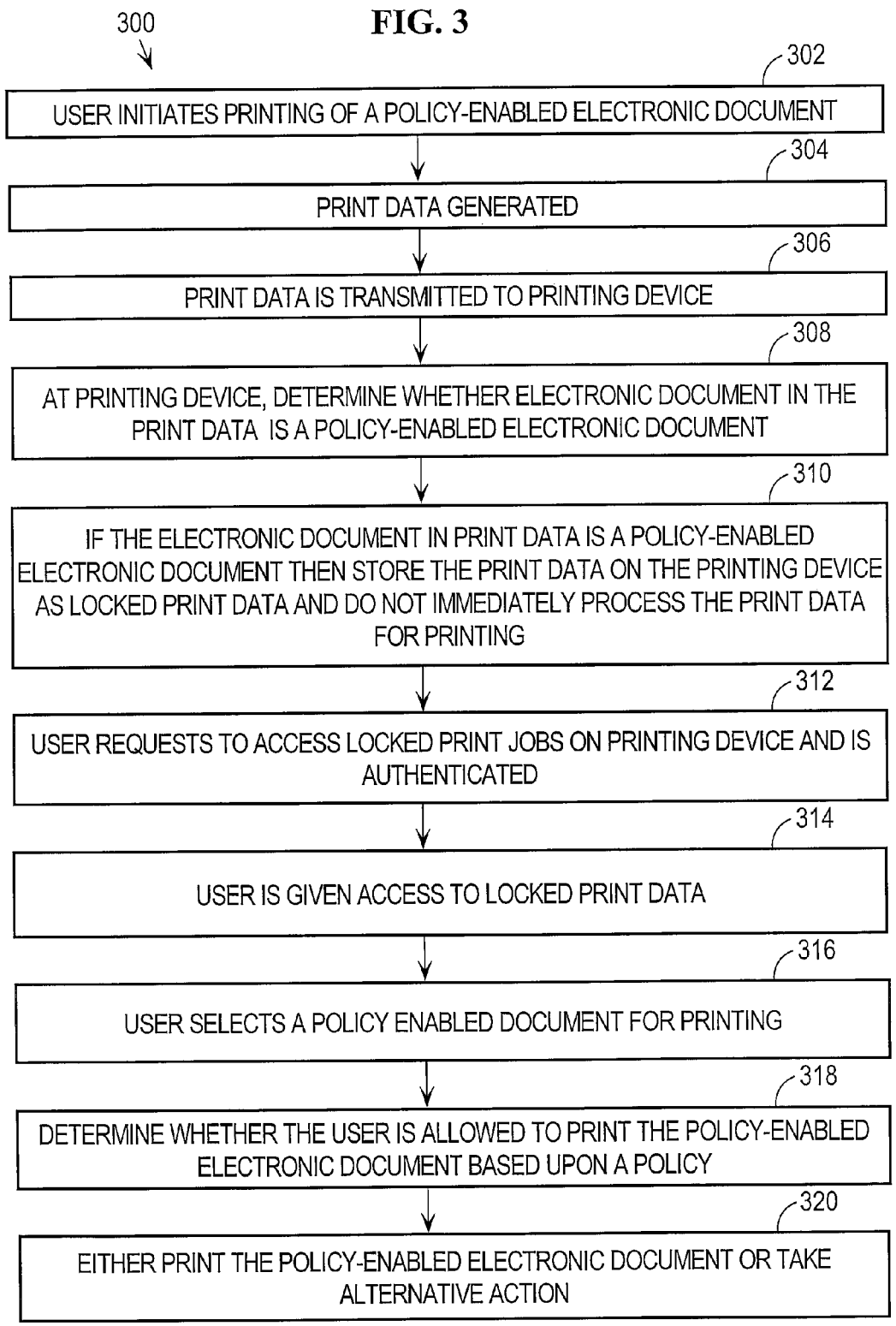
FIG. 3 is a flow diagram that depicts an approach for printing a policy-enabled electronic document using locked printing, according to one embodiment of the invention

FIG. 3 is a flow diagram 300 that depicts an approach for printing a policy-enabled electronic document using locked printing, according to one embodiment of the invention. In step 302, a user initiates printing of a policy-enabled document. For example, a user of client device 104 initiates printing of an electronic document via application 112. The electronic document may have been designated, for example via application 112, as a policy-enabled document at the time of creation or at a later time.

In step 304, print data is generated by print driver 114 and the print data indicates that the electronic document reflected in the print data is a policy-enabled document. For example, the print data, or a header associated with the print data, may include one or more Print Job Language (PJL) or Page Descriptor Language (PDL) commands that specify that the electronic document is a policy-enabled document.

In step 306, the client device 104 transmits the print data to the printing device 102 over network 110. To cause the print data to be processed by locked print process 120, the print data may be transmitted to a particular port. For example, the printing data may be transmitted to a particular Transport Control Protocol (TCP) port, such as port 9100 or 515 as two possible examples, to cause locked print process 120 to receive and process the print data. Alternatively, the print data may simply be sent to the printing device 102 and an operating system routine or other routine forwards the print data to locked print process 120 for processing.

In step 308, at the printing device, a determination is made whether the electronic document in the print data is a policy-enabled electronic document. According to one embodiment of the invention, the job capture and store module 200 of locked print process 120 examines the print data to determine whether the electronic document reflected in the print data is a policy-enabled electronic document. This may be determined, for example, by the presence of one or more commands or codes in the print data that indicate that the electronic document is a policy-enabled electronic document. The data indicating that an electronic document is a policy-enabled electronic document may be contained in a header portion of the print data, in the body portion of the print data, or any combination of a header portion and body portion of the print data. For example, in some implementations, the application that generates the print data in conjunction with a print driver may create a header that is appended to the print data and the header contains one or more commands that indicate that the electronic document contained in the print data is a policy-enabled electronic document. According to one embodiment of the invention, the presence in the print data of a APSPASSWORD command indicates that the electronic document is a policy-enabled electronic document.

In step 310, if the electronic document reflected in the print data is a policy-enabled electronic document, then the print data is stored on the printing device and not immediately processed for printing. According to one embodiment of the invention, the print data is stored on storage 122 and managed as locked print data. If the electronic document reflected in the print data is not a policy-enabled electronic document, the print data is processed normally.

In step 312, a user requests access to locked print jobs stored on the printing device and is authenticated. For example, a user may select a locked print jobs button or icon on user interface 116 to request access to locked print jobs stored on printing device 102. Then the user is queried for user credential data, such as a user ID and password. The user credential data is authenticated. For example, locked print process 120 may be configured to authenticate the user credential data based upon data stored locally on storage 122. This may include, for example, comparing a user ID and password pair specified in the user credential data to a list of verified user ID/password pairs. As another example, a one-way hash function may be used to generate a result based upon the user ID/password pair specified in the authentication data. The result may then be compared to a list of verified results. These are just two examples of how authentication of the user credential data may be performed and the invention is not limited to any particular authentication mechanism or approach. Instead of authenticating the user credential data locally on printing device 102, the user credential data may be authenticated remotely with respect to printing device 102. For example, locked print process 120 may cause the user credential data to be transmitted to another location, e.g., authentication server 108 over network 110, for authentication. Locked print process 120 receives a return indication from the other location indicating whether the authentication data was verified.

If the user is successfully authenticated, then in step 314, the user is given access to the locked print data. For example, a list of locked print jobs associated with the user may be displayed on the user interface 116. Print data may be arranged on the user interface 116, for example, sorted by name or in an order in which the print data was received by printing device 102. The graphical user interface may also include one or more user interface objects that allow a user to select one or more print data to be processed at printing device 102 and one or more actions to be performed on those print data. For example, a user may select a user interface object associated with particular print data and then select a user interface object associated with a printing or deleting function to cause the particular print data to be processed accordingly. Users may be given different types of access to locked print data, depending upon a particular implementation. For example, users may be given access to only the print data that they generated. As another example, users may be given access to all locked print data associated with a logical group, such as a department, project, team, etc. As yet another example, an administrative user may be given access to all locked print data on a printing device so that the administrative user can properly manage the printing device. Access may be based upon the user credential data or other data stored on printing device 102.

In step 316, the user selects a policy-enabled electronic document to be processed and one or more actions to be performed on the print data. In the present example, the user selects a policy-enabled electronic document for printing.

In step 318, a determination is made, based upon a policy, whether the user is allowed to print the policy-enabled electronic document. According to one embodiment of the invention, the locked print process 120 uses policy server 106 to make this determination. This may include, for example, the locked print process 120 transmitting to policy server 106 data that identifies the policy-enabled electronic document selected for printing by the user, along with at least part of the user credential information, for example a user ID. According to one embodiment of the invention, the user interface and PSM client module 202 acts as a policy client with respect to the policy server 106 and provides the interaction with the policy server 106. The policy server 106 determines, based upon one or more policies, whether the user associated with the user ID is authorized to access the policy-enabled electronic document. The policy applied to make this determination may be specific to the printing of electronic documents, i.e., a print-specific policy, or may be a more general policy applied to any type of access to electronic documents. For example, a particular user may be authorized to have read-only access to a particular electronic document, but not print access.

The policy server 106 then returns to the locked print process 120 data that indicates whether the user associated with the user ID is authorized to access the policy-enabled electronic document. The locked print process 120 may also provide the full user credential data to policy server 106 to allow the policy server 106 to perform authentication in conjunction with authentication server 108.

Additional authentication may also be performed in conjunction with applying the policy. For example, when a user selects to print a policy-enabled electronic document, the user may be queried for additional user credential data, such as a user ID and password, that are used by the policy server 106 to provide additional authentication of the user. Although policy server 106 is depicted in the figures and described herein as being a separate entity from the printing device 102, the functionality provided by policy server 106 may be implemented locally on printing device 102. For example, printing device 102 may be configured with a policy process that makes the determination whether a user is authorized to access a particular policy-enabled electronic document.

In step 320, the policy-enabled electronic document is printed if the user is allowed to print the policy-enabled document. This may include decrypting the policy-enabled electronic document using a decryption key received from policy server 106, or another source. Once successfully printed, the policy-enabled document may be deleted from storage 122 or retained for further processing. If the user is not allowed to print the policy-enabled document, then other action may be taken. For example, a message may be displayed on the user interface 116 of printing device 102 to inform the user that the user is not authorized to print the policy-enabled document.

Figure 4:
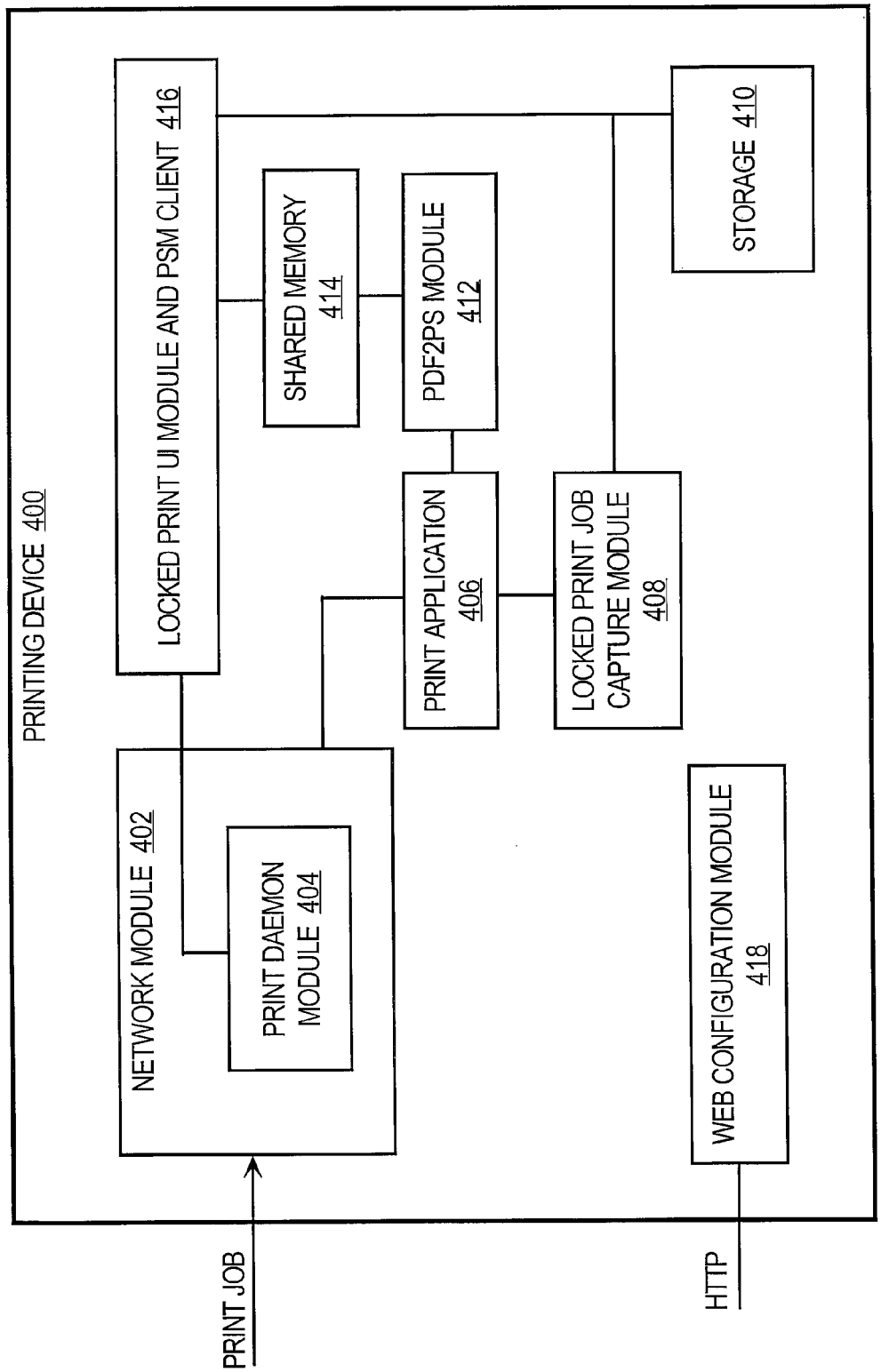
FIG. 4 is a block diagram that depicts an example implementation of a printing device configured to support printing of policy-enabled electronic documents using locked printing, according to one embodiment of the invention.

FIG. 4 is a block diagram that depicts an example implementation of a printing device 400 configured to support printing of policy-enabled electronic documents using locked printing, according to one embodiment of the invention. Printing device 400 includes a network module 402 for receiving print jobs over a communications link. Network module 402 includes a print daemon module 404. Received print jobs are processed by a print application 406. A locked print job capture module 408 processes print jobs and determines whether the print jobs are normal print jobs, locked print jobs, or policy-enabled print jobs. Locked print job capture module 408 may make this determination, for example, by examining the headers of received print jobs and determining whether the headers contain commands that indicate the type of print job. Locked print job capture module 408 is configured to cause locked print jobs to be stored on storage 410, that may be any type of volatile storage, non-volatile storage, or combination of volatile and non-volatile storage. A PDF2PS module 412 is configured to convert print jobs between PDF and postscript formats and accesses a shared memory 414. A locked print UI module and PSM client 416 provides UI functionality and also interacts as a policy server client with a policy server. The locked print UI module and PSM client 416 also has a local connection to the print daemon module 404. A Web configuration module 418 allows a user, such as an administrator, to configure locked print functionality on printing device 400. Thus, in the example depicted in FIG. 4, a locked print application includes the locked print job capture module 408, the locked print UI module and PSM client 416 and the Web configuration module 418.

IV. Implementation Mechanisms

The approach described herein for printing policy-enabled electronic documents using locked printing may be implemented using Web Services. For example, printing device 102 may be a Web Services enabled device and support discovery, metadata exchange and event processing functionality.

Figure 5:
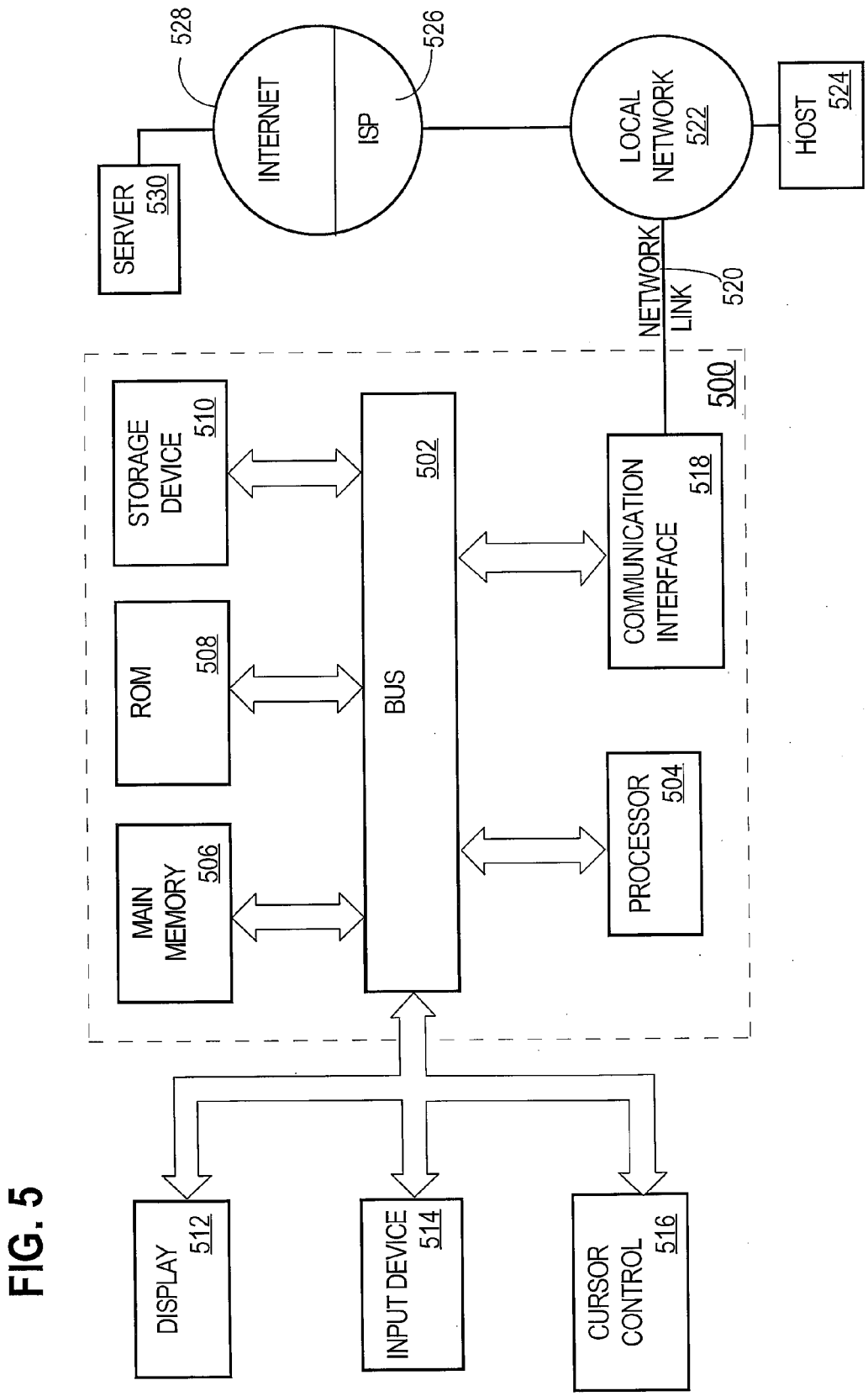
FIG. 5 is a block diagram of a computer system on which embodiments of the invention may be implemented.

The approach described herein for printing policy-enabled electronic documents using locked printing may be implemented on any type of computing platform or architecture. For purposes of explanation, FIG. 5 is a block diagram that depicts an example computer system 500 upon which embodiments of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a computer to operation in a specific manner. In an embodiment implemented using computer system 500, various computer-readable media are involved, for example, in providing instructions to processor 504 for execution. Such a medium may take many forms, including but not limited to, non-volatile media and volatile media. Non-volatile media includes, for example, optical or magnetic disks, such as storage device 510. Volatile media includes dynamic memory, such as main memory 506. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A printing device comprising:
a user interface configured to display information to users and receive user input from the users; and
a locked print process executing on the printing device and being configured to:
examine header data contained in print data received by the printing device to determine whether the header data contains one or more print job language (PJL) commands that indicate that an electronic document contained in the print data is a policy-enabled document,
if the electronic document contained in the print data is a policy-enabled document, then cause the print data to be stored at the printing device instead of being processed for printing,
in response to both a successful verification of a user to access the printing device and a request to print the electronic document via the user interface at the printing device, transmit, over a network to a policy server, both document identification data that identifies the electronic document and user credential data for the user to allow the policy server to determine, based upon the document identification data, the user credential data and a policy, whether the user is authorized by the policy to print the electronic document, wherein the policy specifies whether the user is authorized to print the electronic document, and
if the user is authorized by the policy to print the electronic document, then causing the electronic document to be printed at the printing device.

2. The printing device as recited in claim 1, wherein the locked print process is further configured to cause a list of print jobs associated with the user to be displayed on the user interface and select one or more of the print jobs for printing.

3. The printing device as recited in claim 1, wherein the user credential data that the locked print process transmits over the network to the policy server is different than user credential data used to verify the user to access the printing device.

4. The printing device as recited in claim 3, wherein the locked print process is further configured to query the user via the user interface for the user credential data used to verify the user to access the printing device.

5. The printing device as recited in claim 1, further comprising a print process configured to process print data and cause a printed version of an electronic document contained in the print data to be generated by the printing device.

6. A computer-implemented method for processing a policy-enabled electronic document at a printing device, the computer-implemented method comprising:
a locked print process executing on the printing device and:
examining header data contained in print data received by the printing device to determine whether the header data contains one or more print job language (PJL) commands that indicate that an electronic document contained in the print data is a policy-enabled document,
if the electronic document contained in the print data is a policy-enabled document, then causing the print data to be stored at the printing device instead of being processed for printing,
in response to both a successful verification of a user to access the printing device and a request to print the electronic document via the user interface at the printing device, transmit, over a network to a policy server, both document identification data that identifies the electronic document and user credential data for the user to allow the policy server to determine, based upon the document identification data, the user credential data and a policy, whether the user is authorized by the policy to print the electronic document, wherein the policy specifies whether the user is authorized to print the electronic document, and
if the user is authorized by the policy to print the electronic document, then causing the electronic document to be printed at the printing device.

7. The computer-implemented method as recited in claim 6, wherein the locked print process is further configured to cause a list of print jobs associated with the user to be displayed on the user interface and select one or more of the print jobs for printing.

8. The computer-implemented method as recited in claim 6, wherein the user credential data that the locked print process transmits over the network to the policy server is different than user credential data used to verify the user to access the printing device.

9. The computer-implemented method as recited in claim 8, wherein the locked print process is further configured to query the user via the user interface for the user credential data used to verify the user to access the printing device.

10. The computer-implemented method as recited in claim 6, further comprising a print process configured to process print data and cause a printed version of an electronic document contained in the print data to be generated by the printing device.

11. A non-transitory computer-readable medium for processing a policy-enabled electronic document at a printing device, the computer-readable medium carrying instructions which, when processed by one or more processors, cause:
a locked print process executing on the printing device and:
examining header data contained in print data received by the printing device to determine whether the header data contains one or more print job language (PJL) commands that indicate that an electronic document contained in the print data is a policy-enabled document,
if the electronic document contained in the print data is a policy-enabled document, then causing the print data to be stored at the printing device instead of being processed for printing,
in response to both a successful verification of a user to access the printing device and a request to print the electronic document via the user interface at the printing device, transmit, over a network to a policy server, both document identification data that identifies the electronic document and user credential data for the user to allow the policy server to determine, based upon the document identification data, the user credential data and a policy, whether the user is authorized by the policy to print the electronic document, wherein the policy specifies whether the user is authorized to print the electronic document, and
if the user is authorized by the policy to print the electronic document, then causing the electronic document to be printed at the printing device.

12. The non-transitory computer-readable medium as recited in claim 11, wherein the locked print process is further configured to cause a list of print jobs associated with the user to be displayed on the user interface and select one or more of the print jobs for printing.

13. The non-transitory computer-readable medium as recited in claim 11, wherein the user credential data that the locked print process transmits over the network to the policy server is different than user credential data used to verify the user to access the printing device.

14. The non-transitory computer-readable medium as recited in claim 13, wherein the locked print process is further configured to query the user via the user interface for the user credential data used to verify the user to access the printing device.

15. The non-transitory computer-readable medium as recited in claim 11, further comprising a print process configured to process print data and cause a printed version of an electronic document contained in the print data to be generated by the printing device.

* * * * *

UNITED STATES PATENT AND TRADEMARK OFFICE
CERTIFICATE OF CORRECTION

PATENT NO. : 8,797,563 B2
APPLICATION NO. : 12/059836
DATED : August 5, 2014
INVENTOR(S) : Jayasimha Nuggehalli, Seiichi Katano and Seong Kim It is certified that error appears in the above-identified patent and that said Letters Patent is hereby corrected as shown below:

Title page:

1. Title page, item (56) "References Cited", "OTHER PUBLICATIONS", insert --U.S. Appl. No. 10/656,592, filed Jan. 22, 2007, Notice of Publication, Jul. 24, 2008--
2. Title page, item (56) "References Cited", "OTHER PUBLICATIONS", insert --U.S. Appl. No. 11/439,796, filed May 23, 2006, Office Action, Jan. 15, 2010--
3. Title page, item (56) "References Cited", "OTHER PUBLICATIONS", insert --U.S. Appl. No. 12/166,999, filed Jul. 2, 2008, Office Action, Jun. 6, 2012--
4. Title page, item (56) "References Cited", "OTHER PUBLICATIONS", insert --U.S. Appl. No. 11/880,359, filed Jul. 20, 2007, Office Action, Aug. 8, 2011--
5. Title page, item (56) "References Cited", "OTHER PUBLICATIONS", insert --U.S. Appl. No. 12/059,986, filed Mar. 31, 2008, Office Action, Mar. 15, 2012--
6. Title page, item (56) "References Cited", "OTHER PUBLICATIONS", insert --U.S. Appl. No. 12/059,916, filed Mar. 31, 2008, Office Action, Mar. 15, 2012--
7. Title page, item (56) "References Cited", "OTHER PUBLICATIONS", insert --U.S. Appl. No. 11/656,592, filed Jan. 22, 2007, Final Office Action, Feb. 28, 2012--
8. Title page, item (56) "References Cited", "OTHER PUBLICATIONS", insert --U.S. Appl. No. 11/880,359, filed Jul. 20 2007, Office Action, Apr. 4, 2012--
9. Title page, item (56) "References Cited", "OTHER PUBLICATIONS", insert --U.S. Appl. No. 13/363,144, filed Jan. 31, 2012, Notice of Allowance, Feb. 1, 2013--
10. Title page, item (56) "References Cited", "OTHER PUBLICATIONS", insert --U.S. Appl. No. 12/166,999, filed Jul. 2, 2008, Final Office Action, Jan. 3, 2013--
11. Title page, item (56) "References Cited", "OTHER PUBLICATIONS", insert --U.S. Appl. No. 12/166,999, filed Jul. 2, 2008, Advisory Action, Mar. 18, 2013--

Signed and Sealed this
Seventeenth Day of February, 2015

Michelle K. Lee
*Deputy Director of the United States Patent and Trademark Office*

CERTIFICATE OF CORRECTION (continued)
U.S. Pat. No. 8,797,563 B2

Title page:

12. Title page, item (56) "References Cited", "OTHER PUBLICATIONS", insert --U.S. Appl. No. 12/059,916, filed Mar. 31, 2008, Office Action, Mar. 25, 2013--

13. Title page, item (56) "References Cited", "OTHER PUBLICATIONS", insert --U.S. Appl. No. 11/439,796, filed May 23, 2006, Office Action, Jan. 5, 2010--

14. Title page, item (56) "References Cited", "OTHER PUBLICATIONS", insert --U.S. Appl. No. 11/880,359, filed Jul. 20, 2007, Final Office Action, Nov. 29, 2011--

15. Title page, item (56) "References Cited", "OTHER PUBLICATIONS", insert --U.S. Appl. No. 12/368,168, filed Feb. 9, 2009, Notice of Allowance, Oct. 7, 2011--

16. Title page, item (56) "References Cited", "OTHER PUBLICATIONS", insert --U.S. Appl. No. 12/166,741, filed Jul. 2, 2008, Notice of Allowance, Sep. 22, 2011--

17. Title page, item (56) "References Cited", "OTHER PUBLICATIONS", insert --U.S. Appl. No. 12/166,999, filed Jul. 2, 2008, Office Action, Jun. 6, 2012--

18. Title page, item (56) "References Cited", "OTHER PUBLICATIONS", insert --U.S. Appl. No. 13/396,401, filed Feb. 4, 2012, Office Action, May 7, 2012--

19. Title page, item (56) "References Cited", "OTHER PUBLICATIONS", insert --U.S. Appl. No. 13/363,144, filed Jan. 31, 2012, Office Action, Oct. 17, 2012--

20. Title page, item (56) "References Cited", "OTHER PUBLICATIONS", insert --U.S. Appl. No. 12/059,916, filed Mar. 31, 2008, Advisory Action, Dec. 6, 2012--

21. Title page, item (56) "References Cited", "OTHER PUBLICATIONS", insert --U.S. Appl. No. 11/788,517, filed Apr. 20, 2007, Office Action, Oct. 3, 2011--

22. Title page, item (56) "References Cited", "OTHER PUBLICATIONS", insert --U.S. Appl. No. 12/059,916, filed Mar. 31, 2008, Final Office Action, Jul. 24, 2013--

23. Title page, item (56) "References Cited", "OTHER PUBLICATIONS", insert --U.S. Appl. No. 12/059,916, filed Mar. 31, 2008, Examiner's Answer, Jul. 23, 2013--